Patented Apr. 4, 1950

2,502,457

UNITED STATES PATENT OFFICE 2,502,457

LINOLEUM COMPOSITIONS

John S. Heckles, Lancaster Township, Lancaster County, Pa., assignor to Armstrong Cork Company, Lancaster, Pa., a corporation of Pennsylvania No Drawing. Application September 29, 1947, Serial No. 776,859

14 Claims. (Cl. 260—23)

This invention or discovery relates to linoleum compositions, and it comprises a linoleum composition which includes a plasticized hydrolyzed copolymer of vinyl chloride and vinyl acetate; all as more fully hereinafter set forth and as claimed.

The cements or binders used in making linoleum are well known and contain a characteristic substance prepared by thickening or bodying a drying oil or a semidrying oil, hereinafter referred to as a siccative oil, by polymerization induced by heat, by an oxidation process or both by heat and oxidation. There are various well-known ways of preparing the polymerized oil used in the manufacture of linoleum. Polymerization of the siccative oil can be obtained by simply heating the oil to a high temperature on the order of 500° F. for a number of hours, generally 12 hours or longer. The resulting cement is known as "Taylor oil cement." The preparation of "Taylor oil" is described in British Patent No. 2,057 of 1871. Polymerization can also be obtained by exposing the oil to air to effect both polymerization and oxidation. When the oxidation and polymerization are effected by trickling the oil over hanging sheets of scrim cloth, the product is known as "scrim or shed oil." Such a process is disclosed in British Patents 209/1860 and 1,037/1863 to Frederick Walton, the inventor of linoleum. When the oil is prepared by blowing air through a quantity of oil in an oxidizer, the product is known as "mechanical oil." A process of this sort is disclosed in British Patent No. 7,742, of 1893, to Wood-Bedford and is sometimes referred to as the Wood-Bedford process. In all of these processes, a semisolid plastic mass or siccative oil gel results.

Taylor oil cement is often used in the condition it comes from the kettle without the addition of resin. With scrim or shed oil and with mechanical oil, common practice is to incorporate a resin with the polymerized siccative oil gel. In one method, the resin is charged with the oil into the mechanical oxidizer, and the polymerization and oxidation is effected in the presence of the resin. This results in a siccative oil-resin gel cement as discharged from the oxidizer.

Where scrim or shed oil is used, or when mechanical oil is employed, common practice is to add the resin to the siccative oil gel by the use of a heated mixer to form a siccative oil-resin gel.

Where a resin is used as part of the cement, it may be any naturally occurring resin, fossil resin, or synthetic resin, or a combination of such resins. Rosin, ester gum, kauri gum, copal, alkyd resin, rosin modified phenol-aldehyde resin, phenol-aldehyde resin, and the like, or mixtures thereof may be used. Rosin is at present the most widely used resin. All such resin-containing linoleum cements, regardless of when or how the resin is incorporated, are properly termed "siccative oil-resin gel" and are also included in the more generic term "siccative oil gel."

Ordinarily, linoleum cements comprise 65 to 85% by weight of siccative oil and about 15 to 35% by weight of resin. The drying oil most commonly employed is linseed oil, and other oils, such as soya bean oil, menhaden oil, perilla oil, rapeseed oil, China-wood oil, and the like, or mixtures thereof, may be used. If desired, these drying oils may be modified by the addition of suitable reagents, such as tall oil, tall oil esters, and the like, in various amounts, depending upon the specific oil. The product known in the art as linoleum composition is prepared by admixing the linoleum cement with suitable fillers, such as cork, wood flour, mineral fillers, pigments, and the like, and thereafter forming the mix into a sheet. Normally, the mix is applied to a backing, such as burlap, saturated felt, cotton fabric, or the like, and is consolidated thereon by calendering or by heated platen presses. In some instances, the backing is omitted. Generally speaking, the linoleum composition which may or may not be applied to a backing comprises 30% to 40% cement or binder and 60% to 70% filler.

In all cases, it is necessary that the product, after consolidation, undergo a further heating process to render it sufficiently hard and resistant to be commercially serviceable. This process must be carried out after mixing and consolidation have been effected and is usually accomplished by hanging the linoleum composition in a heated stove or oven. Maturing may be accomplished at about 175° F. and about 30 days for ¼" thicknesses. This is an expensive operation involving a large investment in stoves and, as mentioned above, requires considerable time.

As hereinafter used, the term "linoleum composition" shall include both the matured and nonmatured admixtures of linoleum cement and filler ingredients.

Various ingredients have been added to linoleum compositions for the purpose of accelerating the maturing of the linoleum mix. Among the materials which have proved to be fairly efficient accelerators for linoleum compositions have been certain condensation products of formaldehyde with certain phenols and cresols which, when added in small amounts to the linoleum compositions, result in a reduction in the time required to mature the linoleum mix. However, the condensation products heretofore used as accelerators in linoleum compositions possess the decided disadvantage of decomposing at the maturing temperatures employed resulting in the formation of highly volatile compounds which are liberated and, therefore, their presence in the stoves and in the mix is a definite health hazard. Further, because of this tendency to decompose, these condensation products sometimes show no appreciable effect upon the maturing of the mix at the temperature at which the linoleum is matured, that is, temperatures of about 160° F. to about 180° F., because the phenols and cresols liberated are recognized antioxidants, and their presence in the stoves prevents to some degree the maturing of the siccative oils in the mix. Another disadvantage resulting from the employement of these particular condensation products is that they tend to discolor the final product.

It has been found that linoleum compositions may be prepared containing a hydrolyzed copolymer of vinyl chloride and vinyl acetate. The incorporation of hydrolyzed vinyl chloride-vinyl acetate copolymer in linoleum compositions results in a decided reduction in the maturing time of the composition. Furthermore, linoleum manufactured from compositions containing hydrolyzed vinyl chloride-vinyl acetate copolymers is characterized by increased resiliency, increased water resistance, increased alkali resistance, and increased flexibility and toughness. The incorporation of hydrolyzed vinyl chloride-vinyl acetate copolymer resins into linoleum compositions may be accomplished in the usual type of internal mixer, and the resulting composition calendered in the usual manner.

While a variety of copolymers of vinyl chloride and vinyl acetate may be employed in reinforcing linoleum, the material described below gives particularly advantageous results. This material may be prepared advantageously by subjecting a mixture containing approximately 90% vinyl chloride and approximately 10% vinyl acetate to polymerization conditions to produce a copolymer of vinyl chloride and vinyl acetate. Generally speaking, the conditions are such as to result in the production of a copolymer having a molecular weight of approximately 49,000. After preparing the copolymer as indicated above, a portion of the acetate groups is hydrolyzed to hydroxyl groups. Advantageous results are obtained by the practice of my invention with vinyl chloride-vinyl acetate copolymers which have been hydrolyzed under such conditions as to replace 20% to 50% of the acetate groups with hydroxyl groups. Particularly advantageous results have been obtained with vinyl chloride-vinyl acetate resins in which 20% to 30% of the acetate groups have been hydrolyzed. Hydrolyzed vinyl chloride-vinyl acetate copolymer resins, which may be employed in the practice of my invention, are soluble in acetone and a 20% solution of butanol in xylol. These resins are not soluble in siccative oils, such as linseed oil, soya bean oil, and the like, or mixtures of such oils, but they are compatible with oxidized and polymerized linseed oil-resin gel and soya bean oil-resin gel, such as are contained in linoleum cement. A hydrolyzed vinyl chloride-vinyl acetate copolymer resin which is typical of the hydrolyzed resins described above is that obtainable from the Bakelite Corporation under the designation "VAGH."

While greatly improved products result from the incorporation of hydrolyzed copolymers of vinyl chloride and vinyl acetate into a linoleum cement, I have found that further improvements result from the incorporation of a plasticized hydrolyzed copolymer into linoleum cement.

In accordance with my invention, a mixture containing 5% to 60% by weight of a plasticizer and 95% to 40% by weight of hydrolyzed copolymer of the type herein described is formed by any suitable method. Particularly advantageous results are obtained with 10% to 40% by weight plasticizer and 90% to 60% by weight of hydrolyzed copolymer. The thus plasticized hydrolyzed copolymer may be mixed with any of the well-known filling materials, such as cork, wood flour, and the like, pigments, and other materials regularly employed in the manufacture of linoleum. The plasticized hydrolyzed copolymer may be added first to the siccative oil gel followed by the addition of the usual pigments and fillers. If desired, the plasticized hydrolyzed copolymer may be blended with the siccative oil-resin gel in an internal mixer or a two-roll mill as a master batch, aliquots of which may then be charged to a second mixture in which the balance of the cement together with filler and color pigment is incorporated. Also, a mixture of siccative oil gel, pigments, and fillers may be formed first, and then the plasticized hydrolyzed copolymer may be added. The order of mixing the plasticized copolymer with the remaining ingredients of the composition is not critical as long as the drying oil has undergone the original processing stage; that is, a treatment according to the scrim process or similar processes well known to the art. The linoleum mix containing plasticized hydrolyzed copolymer may then be calendered or otherwise deposited upon a suitable backing. Linoleum mixes containing plasticized hydrolyzed copolymers in accordance with my invention are matured at a greater saving in time than are the linoleum mixes which contain the cements of the prior art. For example, the maturing time may be cut to a third of that of regular linoleum. The matured product is characterized by increased resiliency, increased resistance, increased alkali resistance, increased flexibility, and increased toughness. For example, its residual indentation may be cut in half, its bend-break angle may be doubled that of regular linoleum, its stiffness may be reduced 25%, and it would be effected, if at all, only slightly by alkali. Plasticizing hydrolyzed copolymers enables the ready incorporation of large amounts of this material in a linoleum composition.

The plasticizers employed in the practice of my invention may be divided broadly into two classes, those known as chemical plasticizers and those commonly referred to as resinous plasticizers. As typical examples of chemical plasticizers, mention is made of such materials as tricresyl phosphate, diisobutyl adipate, di-2-ethylhexyl phthalate, polyethylene glycol di-2-ethylhexoate, and the like. As examples of resinous plasticizers, mention is made of nondrying alkyd resins, for example the condensation products of glycols, such as glycol, diethylene glycol, and the like, dicarboxylic acids, such as sebacic, succinic, and the like, and fatty oils, for example, soya bean oil; oxidizing alkyd resins, for example the condensation products of glycols, such as glycol, diethylene glycol, dicarboxylic acids, such as phthalic acid, and fatty oils, such as soya bean oil, linseed oil, and the like; and straight alkyd resins, such as condensation products of phthalic anhydride and glycol. The alkyds referred to may be termed "plasticizing alkyds." Generally speaking, I have found that the chemical plascticizers are employed advantageously, as they result in products which are more resistant to water absorption and which are, generally speaking, more flexible. They are more efficient as plasticizers than are the resinous plasticizers, as the resinous plasticizers require larger amounts to obtain good plasticization. For instance, generally speaking, a plasticized hydrolyzed copolymer will contain advantageously 10% to 20% by weight of a chemical plasticizer, whereas 20% to 40% by weight of a resinous plasticizer is normally used.

The amount of plasticizer employed in the linoleum composition may be varied, depending, among other things, upon the particular formulation used, the particular plasticizer, and the like. However, generally speaking, I have found that a plasticizing amount, such as 0.5% to 15% by weight of the total composition, results in the production of a highly desirable product. When less than 0.5% by weight of plasticizer is employed, substantially no effect is obtained; however, when more than 15% by weight of plasticizer is utilized, the final product tends to become soft and less desirable as a floor covering. Generally speaking, I prefer to employ 2% to 5% by weight of plasticizer.

Expressed differently, 5% to 75% by weight of plasticized hydrolyzed copolymer based on the weight of siccative oil gel is generally employed. Advantageous results are obtained with 10% to 50% plasticized hydrolyzed copolymer.

While, as indicated above, numerous methods of incorporating the plasticizer in the composition may be employed, I have found that particularly advantageous results may be obtained when the plasticizer and hydrolyzed copolymer are milled together on a suitable mill, such as a two-roll mill, at an elevated temperature such as 200° F. to 240° F. The milling is generally continued until no particle of unplasticized material is noticeable in the mix. Generally speaking, this required about 5 to 10 minutes of milling. Without removing the plasticized hydrolyzed copolymer from the rolls, the linoleum cement and fillers are added. Mixing may be continued until all of the materials are uniformly dispersed. Following the mixing, the rolls are generally cooled to a temperature such as 120° F. to 140° F. and the mix sheeted to the desired dimensions and placed in a cabinet maintained at an elevated temperature such as 120° F. to 200° F. for maturing.

The following specific examples are typical of formulations containing plasticizers in accordance with my invention:

Example I

| | Parts by weight |
|---|---|
| Oxidized and polymerized linseed oil-rosin gel | 112 |
| Whiting | 125 |
| Wood flour | 77 |
| Hydrolyzed vinyl chloride-vinyl acetate copolymer | 30 |
| Tricresyl phosphate | 6 |

Example II

| | Parts by weight |
|---|---|
| Oxidized and polymerized linseed oil-rosin gel | 112 |
| Whiting | 117 |
| Wood flour | 73 |
| Hydrolyzed vinyl chloride-vinyl acetate copolymer | 10 |
| Diisobutyl adipate | 3 |

Example III

| | Parts by weight |
|---|---|
| Oxidized and polymerized soya bean oil-rosin gel | 206 |
| Hydrolyzed vinyl chloride-vinyl acetate copolymer | 56 |
| Di-2-ethylhexyl phthalate | 9 |
| Polyethylene glycol di-2-ethylhexoate | 9 |
| Whiting | 290 |
| Wood flour | 180 |

Example IV

| | Parts by weight |
|---|---|
| Oxidized and polymerized soya bean oil-rosin gel | 196 |
| Hydrolyzed vinyl chloride-vinyl acetate copolymer | 50 |
| Alkyd resin | 34 |
| Lubricant | 0.3 |
| Whiting | 290 |
| Wood flour | 180 |

The use of plasticized hydrolyzed copolymers in linoleum compositions as described herein greatly reduces the time required to completely mature the linoleum and thereby results in valuable savings in time and materials in the linoleum-making process.

In addition to reducing the maturing time and improving the alkali resistance, water resistance, flexibility, and toughness of linoleum compositions prepared from cements or binders resulting from the oxidation and polymerization of linseed oil, the presence of plasticized hydrolyzed vinyl chloride-vinyl acetate copolymers in compositions prepared from soya bean oil results in marked improvement in properties of material containing oxidized and polymerized soya bean oil. Although soya bean oil has been employed heretofore in the manufacture of linoleum compositions, such compositions have resulted in materials which are somewhat less desirable than those materials prepared from linseed oil. In other words, these compositions do not possess physical properties which are comparable to the physical properties of linoleum prepared from linseed oil-rosin cement. In addition, the maturing time of linoleum compositions containing soya bean oil gel heretofore has been so long as to make the production of linoleum therefrom an unusually slow process. The incorporation of polymerized hydrolyzed vinyl chloride-vinyl acetate copolymers in compositions containing soya bean oil cements results in such a marked reduction in maturing time as to make the product competitive from the point of view of production time with compositions containing other siccative oil gels and, in addition, results in products the physical properties of which equal or surpass the materials prepared from linseed oil cements.

To illustrate the results obtained by the incorporation of plasticized hydrolyzed vinyl chloride-vinyl acetate copolymers into linoleum mixes, the following tables are presented.

In preparing the samples which were subjected to test to obtain the results set forth, hydrolyzed copymers of vinyl chloride-vinyl acetate and the particular plasticizer were milled together on a two-roll mill at 220° F. The milling was continued until no particle of unplasticized hydrolyzed copolymer was noticeable on the mix. Without removing the plasticized hydrolyzed copolymer from the rolls, the linoleum cement and filler were added. Mixing was continued until all materials were uniformly dispersed. Following the mixing, the rolls were cooled to 120° F. and the mix sheeted to 0.125" and placed in a 195° F. cabinet for maturing. These samples were matured, conditioned, and tested in the following manner. The samples were conditioned for 5 days and the following tests were made upon each sample:

(1) Per cent indentation with 150 lb. load for 30 seconds with a 0.178" diameter tip.
(2) Per cent residual indentation 15 minutes after original indentation with an 8 oz. load.

(3) Olsen stiffness measured in inch lbs. at 20°.
(4) Per cent water absorption on total immersion.
(5) Bend-break angle.
(6) Spot alkali test which measures the per cent of softening on treatment with alkali.

With every group of sample sheets prepared, a control was made using a base formula without reinforcement to serve as a standard for comparison. The base formula contained 112 grams oxidized and polymerized linseed oil-rosin gel, 73 grams wood flour, and 117 grams York whiting.

The results obtained with both chemical and resinous plasticizers are set forth in Tables B and C below. In Table B, the following abbreviations having the following meanings:

TCP—tricresyl phosphate
DA—diisobutyl adipate
DOP—di-2-ethylhexyl phthalate
4GO—polyethylene glycol di-2-ethylhexoate
N. B.—no break at a 90° bend
VAGH—hydrolyzed copolymer of vinyl chloride and vinyl acetate The numbers beside VAGH and plasticizer are the grams of material added to the base formula.

Table B

|  | Unconditioned | | Conditioned | | | | | |
|---|---|---|---|---|---|---|---|---|
|  | Maturing Time | Indent | Indent | Res. Indent | Olsen Stiffness | Bend-Break Angle | Water Absorp. | Alkali Softening |
|  | Hours | Percent | Percent | Percent |  | Degrees | Percent | Percent |
| VAGH 10 / TCP 3 | 213 | 40 | 43.0 | 11.3 | 2.06 | 60 | 1.48 | +3.1 |
| VAGH 20 / TCP 6 | 165 | 42 | 47.9 | 11.4 | 1.77 | N. B. | 1.24 | −3.6 |
| VAGH 30 / TCP 9 | 165 | 37 | 39.4 | 8.4 | 1.39 | 88 | 1.39 | +4.1 |
| VAGH 40 / TCP 12 | 165 | 34 | 38.9 | 7.2 | 2.31 | 85 | 1.44 | −0.2 |
| VAGH 30 / TCP 3 | 95 | 35 | 37.8 | 9.8 | 2.04 | 89 | 1.18 | −1.5 |
| VAGH 30 / TCP 6 | 95 | 38 | 42.4 | 9.8 | 1.68 | N. B. | 1.38 | +0.8 |
| VAGH 30 / TCP 12 | 165 | 39 | 44.3 | 11.4 | 2.02 | 85 | 1.23 | −2.6 |
| VAGH 20 / D. A. 6 | 165 | 38 | 41.3 | 11.5 | 2.76 | 69 | 1.05 | 0.0 |
| VAGH 40 / D. A. 12 | 165 | 34 | 37.1 | 10.0 | 3.21 | 69 | 1.04 | −4.3 |
| VAGH 30 / D. A. 3 | 95 | 34 | 36.3 | 12.1 | 2.99 | 74 | 1.07 | −3.3 |
| VAGH 30 / D. A. 6 | 95 | 34 | 39.8 | 13.9 | 3.25 | 77 | 1.09 | +2.5 |
| VAGH 30 / D. A. 12 | 165 | 38 | 42.6 | 9.8 | 3.15 | 64 | .94 | −4.0 |
| VAGH 10 / DOP 3 | 211 | 43 | 43.6 | 12.1 | 2.17 | 63 | 1.07 | −5.0 |
| VAGH 20 / DOP 6 | 265 | 43 | 43.8 | 11.9 | 2.08 | 72 | 1.02 | −7.3 |
| VAGH 30 / DOP 9 | 165 | 40 | 42.2 | 12.4 | 2.20 | 89 | .79 | −2.1 |
| VAGH 40 / DOP 12 | 165 | 34 | 33.3 | 8.5 | 4.79 | 49 | .71 | −5.4 |
| VAGH 30 / DOP 3 | 95 | 35 | 38.0 | 10.7 | 3.04 | 74 | .86 | +1.3 |
| VAGH 30 / DOP 6 | 95 | 40 | 42.8 | 12.8 | 2.81 | 85 | .82 | −1.2 |
| VAGH 30 / DOP 12 | 165 | 40 | 41.6 | 10.5 | 2.70 | 76 | .83 | −2.2 |
| VAGH 10 / 4GO 3 | 166 | 42 | 48.4 | 13.2 | 2.70 | 61 | .73 | −5.8 |
| VAGH 20 / 4GO 6 | 166 | 38 | 46.2 | 12.9 | 2.01 | 79 | .82 | −2.2 |
| VAGH 30 / 4GO 9 | 165 | 43 | 45.2 | 11.7 | 2.05 | 88 | .90 | +0.9 |
| VAGH 40 / 4GO 12 | 165 | 40 | 43.8 | 11.3 | 2.81 | 73 | .74 | −2.7 |
| VAGH 30 / 4GO 3 | 95 | 37 | 39.4 | 10.6 | 2.82 | 75 | .87 | −3.0 |
| VAGH 30 / 4GO 12 | 166 | 42 | 46.1 | 10.6 | 2.23 | 74 | .75 | −3.5 |

The results of tests made on these base formula sheets are given in Table A below:

Table A

|  | Unconditioned | | Conditioned | | | | | |
|---|---|---|---|---|---|---|---|---|
|  | Maturing Time | Indent | Indent | Res. Indent | Olsen Stiffness | Bend-Break Angle | Water Absorp. | Alkali Softening |
|  | Hours | Per cent | Per cent | Per cent |  | Degrees | Per cent | Per cent |
| 1 | 642 | 37 | 41.9 | 13.8 | 2.84 | 51 | 1.75 | +7.2 |
| 2 | 454 | 46 | 53.3 | 17.3 | 3.04 | 44 | 1.64 | +6.0 |
| 3 | 441 | 42 | 42.5 | 15.1 | 2.46 | 51 | 1.88 | +4.6 |
| 4 | 480 | 43 | 45.5 | 15.8 | 1.99 | 65 | 1.56 | +24.9 |
| 5 | 529 | 44 | 47.2 | 14.8 | 2.01 | 57 | 1.83 | +21.3 |
| 6 | 528 | 43 | 46.2 | 15.2 | 2.70 | 52 | 1.65 | +26.1 |
| 7 | 429 | 39 | 41.8 | 11.7 | 3.82 | 45 | 2.00 | +4.1 |
| 8 | 621 | 39 | 43.2 | 11.9 | 3.35 | 52 | 1.81 | +13.5 |
| 9 | 606 | 40 | 43.8 | 12.6 | 2.73 | 55 | 1.57 | +26.9 |
| 10 | 540 | 42 | 44.3 | 13.5 | 4.82 | 45 | 1.51 | +10.6 |
| Average | 527 | 41.5 | 45.0 | 14.2 | 3.00 | 52 | 1.72 | +14.5 |

In Table C, Paraplex RG-3 is a nondrying alkyd resin and Paraplex C-49 is an oxidized alkyd resin.

Table C

|  | Unconditioned | | Conditioned | | | | | |
|---|---|---|---|---|---|---|---|---|
|  | Maturing Time | Indent | Indent | Res. Indent | Olsen Stiffness | Bend-Break Angle | Water Absorp. | Alkali Softening |
|  | Hours | Percent | Percent | Percent |  | Degrees | Percent | Percent |
| VAGH 30 Nondrying Alkyd 20 | 192 | 36 | 33.6 | 8.3 | 3.24 | 81 | 1.29 | +0.1 |
| VAGH 30 Nondrying Alkyd 30 | 192 | 37 | 35.3 | 7.5 | 2.60 | 76 | 1.26 | +2.6 |
| VAGH 30 Nondrying Alkyd 40 | 305 | 38 | 35.4 | 7.5 | 2.60 | 75 | 1.28 | +4.1 |
| VAGH 30 Nondrying Alkyd 50 | 305 | 39 | 38.2 | 8.2 | 2.11 | 75 | 1.23 | +1.9 |
| VAGH 30 Oxidizing Alkyd 20 | 263 | 35 | 34.2 | 10.0 | 2.73 | 74 | 1.41 | +4.5 |
| VAGH 30 Oxidizing Alkyd 30 | 263 | 32 | 32.1 | 9.7 | 3.17 | 75 | 1.41 | +6.7 |
| VAGH 30 Oxidizing Alkyd 40 | 263 | 34 | 34.6 | 13.0 | 2.68 | 70 | 1.52 | −5.5 |
| VAGH 30 Oxidizing Alkyd 50 | 263 | 35 | 35.1 | 12.5 | 3.02 | 67 | 1.47 | −1.7 |
| VAGH 30 Straight Alkyd 10 | 97 | 36 | 38.4 | 8.2 | 2.28 | 88 | 1.34 | +5.2 |
| VAGH 30 Straight Alkyd 20 | 216 | 39 | 40.5 | 6.1 | 2.12 | 78 | 1.63 | +5.3 |
| VAGH 30 Straight Alkyd 30 | 216 | 39 | 42.3 | 5.7 | 2.32 | 99 | 1.55 | +5.9 |
| VAGH 30 Straight Alkyd 40 | 216 | 39 | 42.7 | 4.8 | 2.22 | 85 | 1.71 | +3.7 |

In the indentation test, a disc of the covering material is supported upon a steel plate and 150 pounds pressure is applied to a flat-ended cylindrical steel bar 0.178" in diameter and the resulting force applied to the upper surface of the sample for a period of 30 seconds. The load is lowered gently until the bar is in full contact with the sample and the sample in full contact with the plate. After 30 seconds, the load is quickly and completely removed. The penetration of the bar into the sample at the end of the 30 seconds application of pressure is measured and is known as the indentation. This is reported as per cent of the original thickness. Fifteen minutes after removal of the load, the residual indentation is measured under an 8 oz. load to the nearest .001" and calculated as percentage of the original thickness. This percentage figure is known as the per cent of residual indentation.

In the spot alkali test, two 1 square inch areas of the material under test are marked adjacent to one another. On one of the areas, an initial penetration test is made, as described above, using 150 pounds on a 0.178" diameter flat tip for 30 seconds, and the per cent initial penetration is calculated. To the other area is applied approximately 1 cc. of a 2% solution of NaOH which is allowed to remain in contact with the surface for 30 minutes. The alkaline solution is removed by washing with tap water and blotted dry. The exposed area is then allowed to dry for 3 to 5 minutes. An initial penetration test is then performed on the area exposed to the alkaline solution using the same conditions, and the per cent initial penetration is calculated. The difference in per cent initial penetration between the unexposed area and the alkali-treated area is then calculated and reported as the per cent change in initial penetration due to alkali.

The Olsen stiffness tests were conducted on a Tinius-Olsen 50 inch pound capacity test machine using 2 inch wide samples and a 1 inch span. This testing machine is commonly used in the testing of wire, tinplate, felt, and other materials. The designation M. D. stands for machine direction; whereas, the designation A. M. D. stands for across machine direction.

The water immersion results given in the tables were obtained by conditioning a 4" x 2" sample 24 hours in a constant temperature room, weighing the sample to the nearest .01 gram, and immersing the sample on end under 1 inch head of water maintained at 70° F. After 24 hours, the sample was removed from the water, the excess water blotted, and the sample was reweighed.

It can be seen from the above tables that a linoleum reinforced with plasticized hydrolyzed copolymer of vinyl chloride and vinyl acetate may be made that is greatly superior to regular linoleum in many characteristics. This superiority is due to the presence of plasticized hydrolyzed copolymer therein, and such greatly improved results are not obtained when unplasticized material is added, although the addition of unplasticized hydrolyzed copolymer results in improved properties over regular linoleum composition.

The linoleum compositions of my invention are particularly suitable for use in the manufacture of floor coverings which may be manufactured in such gauges as 0.725" to ⅛". The compositions are also suitable for use in the manufacture of wall coverings, desk tops, sink tops, and the like.

While my invention has been described with reference to certain particular embodiments and with reference to certain specific examples, it is to be understood that the invention is not limited thereby. Therefore, changes, omissions, substitutions and/or additions may be made without departing from the spirit of the invention as defined in the appended claims which are intended to be limited only as required by the prior art.

I claim:

1. A linoleum composition comprising a siccative oil gel, a filler, and a mixture containing 40% to 95% by weight of a copolymer of vinyl chloride and vinyl acetate containing about 10% vinyl acetate of which 20% to 50% of the acetate groups have been hydrolyzed, and 5% to 60% by weight of a plasticizer for said copolymer.

2. A linoleum composition comprising a siccative oil gel, a filler, and 5% to 75% by weight based on said gel of a mixture containing 95% to 40% by weight of the product resulting from the hydrolysis of 20% to 30% of the acetate groups of a vinyl chloride-vinyl acetate copolymer containing about 10% vinyl acetate and 5% to 60% by weight of a plasticizer for said product.

3. A linoleum composition comprising an oxidized and polymerized drying oil-resin gel, a filler, and 10% to 50% by weight based on said gel of a mixture containing 90% to 60% by weight of a hydrolyzed copolymer of vinyl chloride and vinyl acetate containing about 10% vinyl acetate of which 20% to 50% of the acetate groups have been hydrolyzed, and 10% to 40% by weight of a plasticizer therefor.

4. A linoleum composition comprising an oxidized polymerized semidrying oil-resin gel, a filler, and 10% to 50% by weight of said gel of a mixture containing 60% to 90% by weight of a hydrolyzed copolymer of vinyl chloride and vinyl acetate containing about 10% vinyl acetate of which 20% to 50% of the acetate groups have been hydrolyzed, and 40% to 10% by weight of a plasticizer for said copolymer.

5. A linoleum composition comprising a linseed oil-rosin gel, a filler, and 5% to 75% by weight based on said gel of a mixture containing 40% to 95% by weight of a hydrolyzed copolymer of vinyl chloride and vinyl acetate containing about 10% vinyl acetate of which 20% to 50% of the acetate groups have been hydrolyzed, and 5% to 60 percent by weight of a plasticizer for said copolymer.

6. A linoleum composition comprising an oxidized and polymerized soya bean oil-rosin gel, a filler, and 5% by 75% by weight of said gel of a mixture containing 40% to 95% by weight of a hydrolyzed copolymer of vinyl chloride and vinyl acetate containing about 10% vinyl acetate of which 20% to 50% of the acetate groups have been hydrolyzed, and 5% to 60 percent by weight of a plasticizer for said copolymer.

7. A floor covering having a base layer to which is applied a wearing surface including an oxidized and polymerized siccative oil gel, a filler, and 5% to 75% by weight based on said gel of a mixture containing 40% to 95% by weight of a hydrolyzed copolymer of vinyl chloride and vinyl acetate containing about 10% vinyl acetate of which 20% to 50% of the acetate groups have been hydrolyzed, and 60% to 5% by weight of a plasticizer for said copolymer.

8. A floor covering comprising a wearing surface which includes an oxidized and polymerized siccative oil gel, a filler, and 5% to 75% by weight of said gel of a mixture containing 40% to 95% by weight of a hydrolyzed copolymer of vinyl chloride and vinyl acetate containing about 10% vinyl acetate of which 20% to 50% of the acetate groups have been hydrolyzed, and 60% to 5% by weight of a plasticizer for said copolymer, said wearing surface being applied to a burlap backing.

9. A felt base floor covering, the wearing surface of which comprises a siccative oil gel, a filler, and 5% to 75% by weight of said gel of a mixture containing 40% to 95% by weight of a hydrolyzed copolymer of vinyl chloride and vinyl acetate containing about 10% vinyl acetate of which 20% to 50% of the acetate groups have been hydrolyzed, and 5% to 60% by weight of a plasticizer for said copolymer.

10. A linoleum cement comprising an oxidized and polymerized linseed oil-rosin gel and 5% to 75% by weight of said gel the product resulting from the hydrolysis of 20% to 30% of the acetate groups of a vinyl chloride-vinyl acetate copolymer containing about 10% vinyl acetate, said product being admixed with 5% to 60% by weight thereof of a plasticizer therefor.

11. A linoleum cement comprising an oxidized and polymerized soya bean oil-resin gel and at least 5% by weight of said gel of the product resulting from the hydrolysis of 20% to 50% of the acetate groups of a vinyl chloride-vinyl acetate copolymer containing about 10% vinyl acetate, said product being admixed with 5% to 60% by weight thereof of a plasticizer therefor.

12. A linoleum composition comprising a siccative oil gel, a filler, at least 5% by weight of said gel of a hydrolyzed copolymer of vinyl chloride and vinyl acetate containing about 10% vinyl acetate of which 20% to 50% of the acetate groups have been hydrolyzed, and 20% to 40% by weight of said hydrolyzed copolymer of a resinous plasticizer for said copolymer.

13. A linoleum composition comprising a siccative oil gel, a filler, at least 5% by weight of said gel of a hydrolyzed copolymer of vinyl chloride and vinyl acetate, and tricresyl phosphate.

14. A linoleum composition comprising a siccative oil gel, a filler, at least 5% by weight of said gel of a hydrolyzed copolymer of vinyl chloride and vinyl acetate containing about 10% vinyl acetate of which 20% to 50% of the acetate groups have been hydrolyzed, and 10% to 20% by weight of said hydrolyzed copolymer of polyethylene glycol di-2-ethylhexoate.

JOHN S. HECKLES.

REFERENCES CITED

The following references are of record in the file of this patent:

UNITED STATES PATENTS

| Number | Name | Date |
|---|---|---|
| 2,242,489 | Turkington | May 20, 1941 |
| 2,300,193 | Allen | Oct. 27, 1942 |
| 2,428,282 | Kemmer | Sept. 30, 1947 |

Certificate of Correction

Patent No. 2,502,457                                                                             April 4, 1950

JOHN S. HECKLES

It is hereby certified that errors appear in the printed specification of the above numbered patent requiring correction as follows:

Column 3, line 5, for "employement" read *employment*; column 4, lines 66 and 67, for "plascticizers" read *plasticizers*; column 8, line 4, for the word "having" read *have*; column 10, line 63, for "0.725'" read *.0725"*; column 11, line 15, for "goups" read *groups*; line 48, for "5% by" read *5% to*; column 12, line 46, for "acetate, and" read *acetate containing about 10% vinyl acetate of which 20% to 50% of the acetate groups have been hydrolyzed, and 10% to 20% by weight of said hydrolyzed copolymer of*;

and that the said Letters Patent should be read with these corrections therein that the same may conform to the record of the case in the Patent Office.

Signed and sealed this 27th day of June, A. D. 1950.

[SEAL]

THOMAS F. MURPHY,
                                                                        *Assistant Commissioner of Patents.*